United States Patent [19]
Brandt et al.

[11] Patent Number: 6,085,130
[45] Date of Patent: Jul. 4, 2000

[54] METHOD AND APPARATUS FOR SELECTING A TRANSITION SCHEME FOR USE IN TRANSITIONING A MOBILE MACHINE FROM A FIRST PATH TO A SECOND PATH

[75] Inventors: Everett G. Brandt, Brimfield; Robert J. McGee; Brian D. Rockwood, both of Peoria, all of Ill.

[73] Assignee: Caterpillar Inc., Peoria, Ill.

[21] Appl. No.: 09/120,758

[22] Filed: Jul. 22, 1998

[51] Int. Cl.[7] .................................................. G06F 165/00
[52] U.S. Cl. .............................................. 701/26; 701/201
[58] Field of Search ................................. 701/25, 26, 23, 701/201, 202; 318/587

[56] References Cited

U.S. PATENT DOCUMENTS

| | | |
|---|---|---|
| 3,507,349 | 4/1970 | Comer et al. . |
| 3,715,572 | 2/1973 | Bennett . |
| 4,253,541 | 3/1981 | Iida et al. ................................. 180/168 |
| 4,875,172 | 10/1989 | Kanayama . |
| 5,083,256 | 1/1992 | Trovato et al. . |
| 5,204,814 | 4/1993 | Noonan et al. ..................... 364/424.02 |
| 5,471,391 | 11/1995 | Gudat et al. ....................... 364/424.07 |
| 5,493,494 | 2/1996 | Henderson ......................... 364/424.07 |
| 5,631,658 | 5/1997 | Gudat et al. ............................. 342/457 |
| 5,646,844 | 7/1997 | Gudat et al. .......................... 364/449.2 |
| 5,945,799 | 8/1999 | Shimizu ................................. 318/587 |

FOREIGN PATENT DOCUMENTS 2068587  8/1981  United Kingdom .

*Primary Examiner*—Michael J. Zanelli
*Attorney, Agent, or Firm*—Haverstock, Garrett & Roberts

[57] ABSTRACT

In one embodiment of the present invention, a method for transitioning a mobile machine from a first path to a second path within a work area includes selecting from among one or more transition schemes, wherein the transitions schemes are composed of one or more interim paths between the first path and the second path. The desired transition scheme is chosen by evaluating one or more performance criteria including whether the interim paths overshoot the second path and whether the interim paths remain within a perimeter surrounding the work area. Additional performance criteria that may be evaluated include the number of interim paths the mobile machine must follow to transition from the end of the first path to the beginning of the second path, the number of heading changes required by the candidate transition scheme, and the amount of the first path and the second path that is traversed by the mobile machine as a result of the candidate transition scheme. A validity grade is determined based on the performance criteria, and the transition scheme having the optimum validity grade is selected. Determining the validity grade may also include using weighting factors on the performance criteria.

22 Claims, 3 Drawing Sheets

METHOD AND APPARATUS FOR SELECTING A TRANSITION SCHEME FOR USE IN TRANSITIONING A MOBILE MACHINE FROM A FIRST PATH TO A SECOND PATH

TECHNICAL FIELD

The present invention relates generally to the operation of a mobile machine for traversing an area of a work site and, more particularly, to a method for transitioning from a first path to a second path by the mobile machine.

BACKGROUND

There is an increasing demand to automate moving machinery that traditionally requires a human operator. There are several reasons for this. Unlike a human operator, automated machinery remains consistently productive regardless of environmental conditions and prolonged work hours. Automated machinery is also ideal for applications where conditions are unsuitable or undesirable for humans. Further, automated machinery enables more accurate operation and compensates for lack of operator skill.

The work cycles of different types of machines may include similar requirements. Some machines, including earth, asphalt, and trash compactors, may repeatedly traverse a site until the material is compressed to a desired degree. Other types of machines, such as lawn mowing machinery, may traverse an area only once during a work cycle. During autonomous operation, these machines require means to determine their position, the area to be traversed, an optimal path to follow while traversing the area, and means to control their movement while traversing the path.

As a mobile machine traverses an area, a series of paths for the machine to follow is typically determined. Some types of machines are capable of performing a work function, such as compacting material, while traveling bi-directionally, i.e., in either a forward or reverse direction. Other machines are capable of performing a work function in one direction only and must be turned to a new heading to move along another path. Regardless of whether the machine is capable of performing a work function in one direction or bi-directionally, means for transitioning from a first path to a second path is required.

In the prior art, systems for achieving a desired degree of compaction or desired site topography using mobile terrain-shaping and material compacting machinery are known. These systems are shown, for example, in U.S. Pat. Nos. 5,631,658; 5,493,494; 5,471,391; and 5,646,844. In these patents, the difference between the actual site topography and the desired site topography is determined on a continual basis and this information is provided to an operator via a real-time display. The machines typically travel along a series of paths over the area. These patents do not, however, disclose means for determining an efficient transition from one path to another as the machine traverses the area.

Accordingly, the present invention is directed to overcoming one or more of the problems as set forth above.

DISCLOSURE OF THE INVENTION

In one embodiment of the present invention, an apparatus and method for transitioning a mobile machine from a first path to a second path within a work area includes selecting from among one or more transition schemes, wherein the transition schemes are composed of one or more interim paths between the first path and the second path. The desired transition scheme is chosen by evaluating one or more performance criteria including whether the interim paths overshoot the second path and whether the interim paths remain within a perimeter surrounding the work area. Additional performance criteria that may be evaluated include the number of interim paths the mobile machine must follow to transition from the end of the first path to the beginning of the second path, the number of heading changes required by the candidate transition scheme, and the amount of the first path and the second path that is not traversed by the mobile machine as a result of the candidate transition scheme. A validity grade is determined based on the performance criteria, and the transition scheme having the optimum validity grade is selected. Determining the validity grade may also include using weighting factors on the performance criteria.

BRIEF DESCRIPTION OF DRAWINQS

BEST MODE FOR CARRYING OUT THE INVENTION

Figure 1:
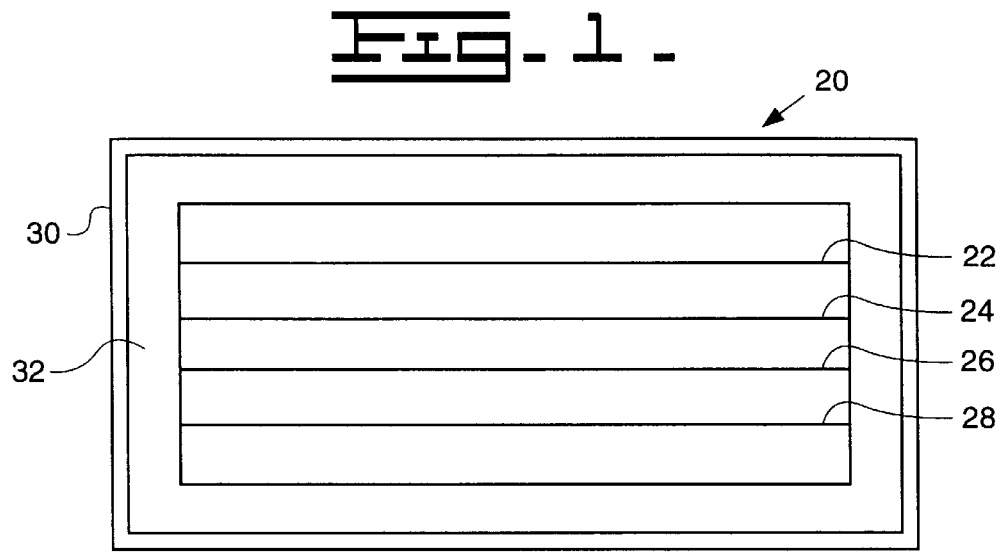
FIG. 1 is a top plan view of a work area having a plurality of work paths.

Referring to FIG. 1, a top plan view of a work area 20 is shown having a plurality of paths 22, 24, 26, 28 bounded by a perimeter 30. A cushion boundary 32 is included between the paths 22, 24, 26, 28 and the perimeter 30 so that small inaccuracies in data provided by sensor systems do not interfere with the present invention as described hereinbelow. The paths 22, 24, 26, 28 are exemplary of the manner in which the work area 20 may be divided where a task such as material compacting or lawn mowing is performed by a mobile machine. It should be noted that a wide variety of patterns may be used to divide the work area 23 into paths. Some factors for selecting a particular pattern include the area covered during one pass of the mobile machine, the turning radius of the mobile machine, and the size and shape of the work area 20. The present invention is applicable to tasks that involve traversing the work area 20 only once or several times.

Figure 2:
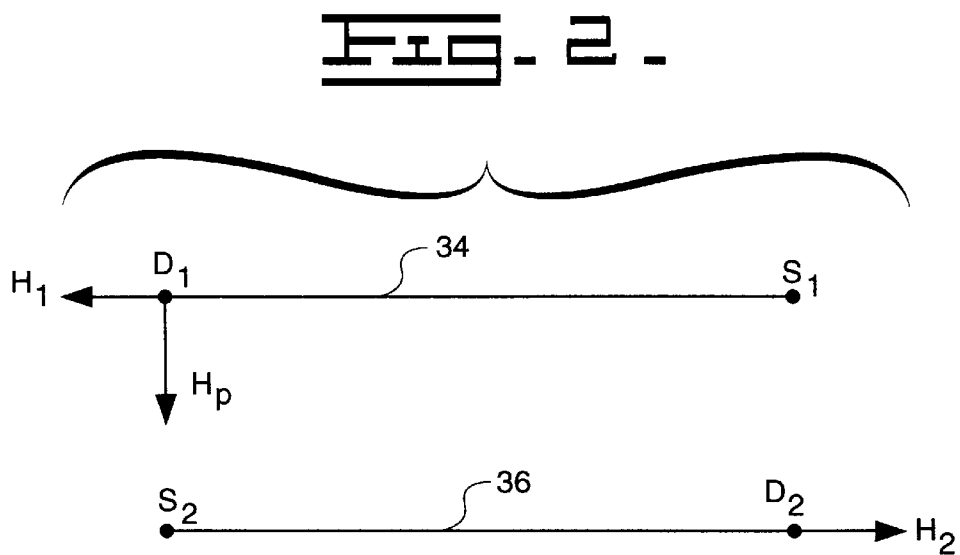
FIG. 2 is a top plan view of a first path and a second path.

FIG. 2 shows two parallel paths, a first path 34, and a second path 36 along which a mobile machine may traverse to accomplish a task. The mobile machine traverses the area from one path to the next. As used herein, the first path 34 refers to the path the mobile machine is currently traversing and the second path 36 refers to the next path the mobile machine will traverse. Each path 34, 36 has a starting point $S_1$, $S_2$, a destination point $D_1$, $D_2$, a heading angle $H_1$, $H_2$ preferably measured with respect to a reference angle, such as true north, and another heading $H_p$ representing the angle between the first destination point $D_1$ and the second starting point $S_2$.

There are many transition schemes that may be used as the mobile machine moves between the paths 34, 36. FIGS. 3 through 10 show examples of eight different transition schemes evaluated in a preferred embodiment of the present invention as candidates in determining the optimum transition scheme for moving the mobile machine from the first path 34 to the second path 36. The present invention includes means to evaluate any number of candidate transition schemes, however, and is not intended to be limited to those shown in FIGS. 3 through 10. The transition schemes included in a particular application will depend on the particular machine's maneuvering capabilities.

The means to evaluate the candidate transition schemes includes logic and equations implemented in one or more software programs. The software programs are executed in a digital computer which are well known in the art and include a data processor, such as a microprocessor, random access memory, read only memory, and a data bus for receiving data from and transmitting data to various devices. The software programs select an optimum transition method by evaluating one or more performance criteria and/or constraints as discussed hereinbelow. The selected transition scheme may be transmitted to another software program, such as an electronically implemented proportional integral control system, as is well known in the art. Such a control system compares the mobile machine's current position to the desired position as indicated by the transition scheme. The difference between the actual and desired positions is used to generate signals to control the motion of the mobile machine as it transitions from the first path 34 to the second path 36.

During the evaluation, all of the transition schemes implemented in the present invention are checked to see if they meet initial, predetermined constraints. These physical constraints include, but are not limited to, the distance between the first path 34 and the second path 36, the amount of time required to execute a particular transition scheme, the size and turning radius of the machine, the amount of overshoot past the second starting point $S_2$, and whether the mobile machine will move outside the perimeter 30 while executing the transition scheme. The tests employed to determine whether these initial constraints are met depend on the particular transition scheme. For each transition scheme that meets the initial constraints, a validity value is determined that provides means for ranking the efficiency of the candidate transition schemes relative to one another. To determine the validity values, additional performance criteria are considered including, but not limited to, the number of direction changes, i.e., starts and stops the machine must make in order to change from a forward direction to a reverse direction and vice versa, when transitioning from the first path 34 to the second path 36, path loss, which is the amount of the path that will not be traversed if a particular transition scheme is used, and the number of interim paths required for the machine to perform a particular transition. An interim path is defined as a path that the machine must follow to transition to the second path 36. A preferred embodiment of the equation for the validity value is:

$$\text{Validity} = k_1 \text{path\_loss} + k_2 {}^* \text{int\_paths} + k_3 {}^* \text{dir\_chgs}$$

where dir_chgs is equivalent to number of direction changes, and int_paths is equivalent to the number of interim paths. Weighting factors $k_1$, $k_2$, and $k_3$ may be used to normalize the performance criteria and/or give more or less emphasis to a particular performance criteria compared to the others. The amount of time required to execute a particular transition scheme is a factor of the number of direction changes and the number of interim paths; i.e., the greater the number of interim paths and direction changes, the greater the amount of time required to execute a particular transition scheme.

The performance criteria as applied to the sample transition schemes shown in FIGS. 3 through 10 is discussed in the following paragraphs.

Figure 3:
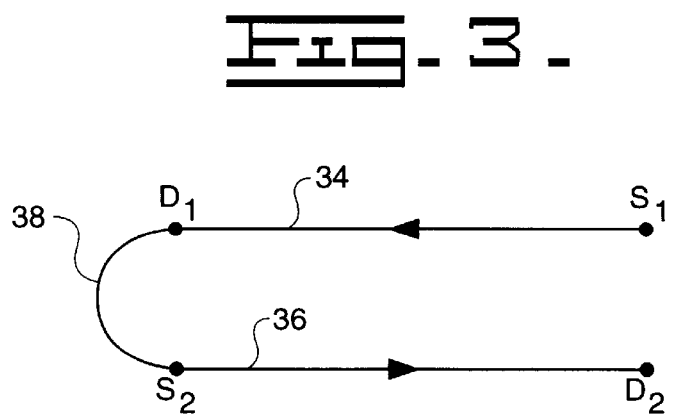
FIG. 3 is a top plan view of a transition scheme.

FIG. 3 is a top plan view of a transition scheme having one interim path 38 in the shape of an outside U-turn between the first path 34 and the second path 36. This transition scheme does not require any direction changes as defined hereinabove since no stops to change from a forward direction to a reverse direction and vice versa must be performed. A first physical constraint is tested by determining whether the U-turn can be executed in the boundary cushion 32, i.e., if the machine's turn radius is less than or equal to the width of the boundary cushion 32. The overshoot constraint is met in this transition scheme when the distance between the destination point $D_1$ of the first path 34 and the start point $S_2$ of the second path 36 is greater than or equal to approximately twice the turning radius of the mobile machine. If this constraint is not met, the mobile machine will overshoot the starting point $S_2$ of the second path 36. Tolerance on the amount of overshoot may be allowed depending on the task being performed and user preference. The outside U-turn transition scheme may be used with mobile machines capable of performing a work function while traveling bi-directionally, i.e., in either a forward or reverse direction, or one direction only. The distance traveled along interim path 38 from the first destination point $D_1$ to the second starting point $S_2$ may be used to predict the amount of time required to complete the transition. This completion time may be used to further evaluate the effectiveness or efficiency of the transition scheme, i.e., more efficient transition schemes will require less time to execute.

Figure 4:
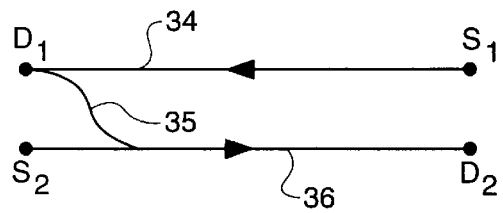
FIG. 4 is a top plan view of another transition scheme.

FIG. 4 shows a top plan view of another transition scheme denoted as an inside side-shift. The mobile machine travels along the first path 34 to the first destination point $D_1$ in one direction, stops, and then moves in the other direction, approaching the second path 36 asymptotically along interim path 35 until it is aligned with the second path 36. This transition scheme requires one direction change since the machine travels in one direction, stops, and travels in another direction to transition to the second path 36. In this transition scheme, the mobile machine does not begin traversing the second path 36 at the second starting point $S_2$ and the amount of the second path 36 that is not traversed is the path loss. The amount of path loss for each transition from one path to another may be accumulated and used to further evaluate the effectiveness of the transition scheme over the entire work area 20. This transition scheme is typically used by mobile machines capable of performing a work function while traveling bi-directionally.

Figure 5:
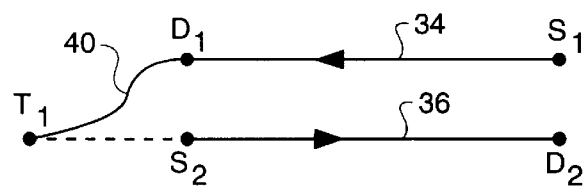
FIG. 5 is a top plan view of another transition scheme.

FIG. 5 shows another transition scheme denoted as an "outside side-shift" wherein the mobile machine travels along the first path 34 to the first destination point $D_1$, turns toward the second path 36 along interim path 40 while traveling to transition point T1, stops at T1, and then moves in the other direction, approaching the second starting point $S_2$. In this transition scheme, the transition point T1 must be within the perimeter 30 and be at a distance from $S_2$ that allows the mobile machine to maneuver to align itself with the second path 36. Only one interim path 40 and one direction change is involved in this transition scheme, and the machine will be aligned to traverse the second path 36 with no stops or further changes in direction from T1. The distance traveled along interim path 40 from the first destination point $D_1$ to the second starting point $S_2$ may be accumulated and used to further evaluate the effectiveness of the transition scheme. This transition scheme is typically used by a mobile machine capable of performing a work function while traveling bi-directionally.

Figure 6:
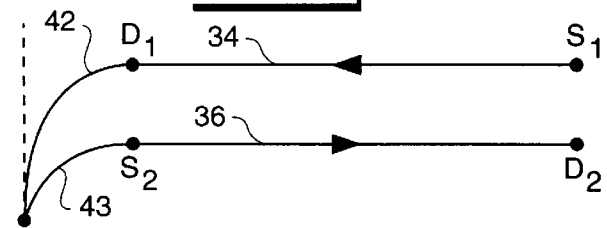
FIG. 6 is a top plan view of another transition scheme.

The transition scheme shown in FIG. 6 is denoted as an outside-toward-switch-back wherein the mobile machine travels along the first path 34 to the first destination point $D_1$, turns toward the second path 36 along interim path 42 to transition point T1, stops at T1, and then moves in the other direction toward the second starting point $S_2$ along interim path 43. In this transition scheme the transition point T1 must be within the perimeter 30 and be at a distance from $S_2$ that allows the mobile machine to maneuver to align itself with the second path 36. The distance traveled along interim paths 42 and 43 from the first destination point $D_1$ to the second starting point $S_2$ may be accumulated and used to further evaluate the effectiveness of the transition scheme. This transition scheme requires two interim paths 42 and 43 and one direction change and is typically used with mobile machines capable of performing a work function while traveling bi-directionally.

Figure 7:
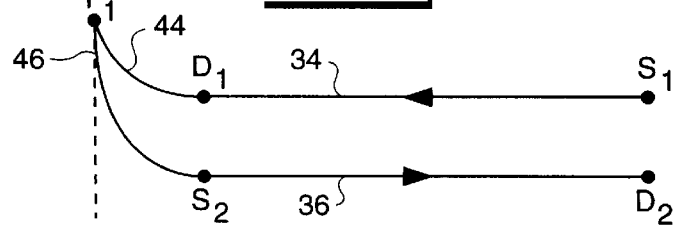
FIG. 7 is a top plan view of another transition scheme.

The transition scheme shown in FIG. 7 is denoted as an outside-away-switch-back that involves two interim paths 44, 46 and one direction change. To perform this transition scheme, the mobile machine travels along the first path 34 to the first destination point $D_1$, turns away from the second path 36 along interim path 44 to transition point T1, stops and changes direction at T1, moves along a second interim path 46 in the other direction toward the second starting point $S_2$. In this transition scheme the transition point T1 must be within the perimeter 30 and be at a distance from $S_2$ that allows the mobile machine to maneuver to align itself with the second path 36. The distance traveled along interim paths 44 and 46 from the first destination point $D_1$ to the second starting point $S_2$ may be accumulated and used to further evaluate the effectiveness of the transition scheme. This transition scheme is typically used with mobile machines capable of performing a work function while traveling bi-directionally.

Figure 8:
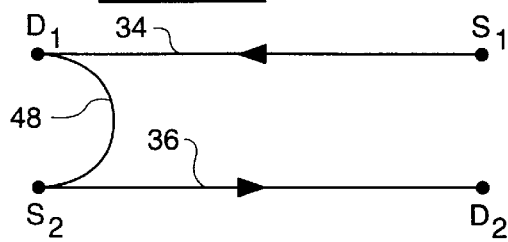
FIG. 8 is a top plan view of another transition scheme.

FIG. 8 is a top plan view of a transition scheme having one interim path 48 in the shape of an inside U-turn between the first path 34 and the second path 36. The physical constraint to determine whether the U-turn can be executed in the boundary cushion 32 is not required since the interim path 48 lies completely within the first path 34 and the second path 36. The overshoot constraint is met in this transition scheme when the distance between the destination point $D_1$ of the first path 34 and the start point $S_2$ of the second path 36 is greater than or equal to approximately twice the turning radius of the mobile machine. If this constraint is not met, the mobile machine will overshoot the starting point $S_2$ of the second path 36. A certain amount of overshoot may be allowed depending on the task being performed and user preference. The inside U-turn transition scheme requires direction change from $D_1$ to $S_2$ and another direction change from $S_2$ to $D_2$ and may be used with mobile machines capable of performing a work function while traveling in one direction only or bi-directionally.

Figure 9:
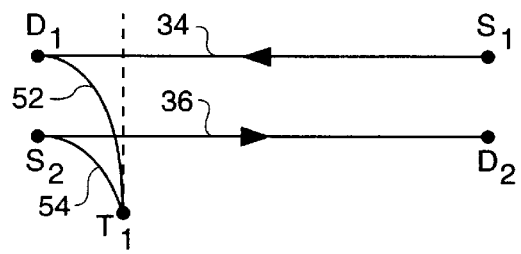
FIG. 9 is a top plan view of another transition scheme.

The transition scheme shown in FIG. 9 is denoted as an inside-toward-switch-back that requires two interim paths 52, 54 and three direction changes. The mobile machine travels along the first path 34 to the first destination point $D_1$, makes one direction change toward the second path 36 along interim path 52 to transition point T1, stops at T1, and then makes another direction change toward the second starting point $S_2$ along interim path 54, and a final direction change from $S_2$ to follow the second path 36. In this transition scheme the transition point T1 must be within the perimeter 30 and be at a distance from $S_2$ that allows the mobile machine to maneuver to $S_2$ and align itself with the second path 36. The distance traveled along interim paths 52 and 54 from the first destination point $D_1$ to the second starting point $S_2$ may be accumulated and used to further evaluate the effectiveness of the transition scheme. This transition scheme is typically used with mobile machines capable of performing a work function while traveling bi-directionally.

Figure 10:
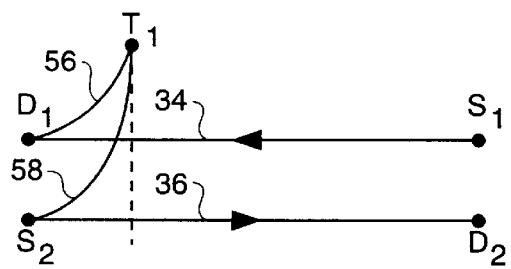
FIG. 10 is a top plan view of another transition scheme.

The transition scheme shown in FIG. 10 is denoted as an inside-away-switch-back that involves two interim paths 56, 58, and three direction changes. To perform this transition scheme, the mobile machine travels along the first path 34 to the first destination point $D_1$, turns away from the second path 36 along interim path 56 to transition point T1, stops at T1, and moves along a second interim path 58 toward the second starting point $S_2$. In this transition scheme the transition point T1 must be within the perimeter 30. The distance traveled along interim paths 56, 58, from the first destination point $D_1$ to the second starting point $S_2$ may be accumulated and used to further evaluate the effectiveness of the transition scheme. This transition scheme is typically used with mobile machines capable of performing a work function while traveling bi-directionally.

INDUSTRIAL APPLICABILITY

Figure 11:
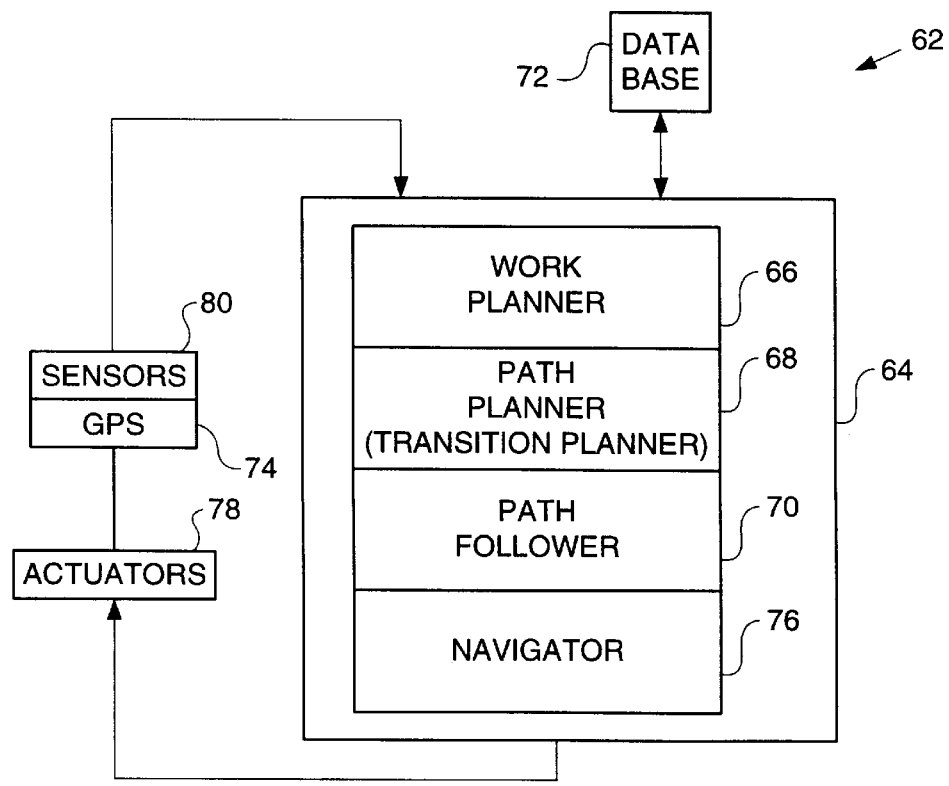
FIG. 11 is a functional block diagram of the present invention in a control system for a mobile machine.

The principles and applications of the present invention lend themselves to virtually any mobile machine that traverses a series of paths 22, 24, 26, 28 while performing a task within a work area 30. Such mobile machinery may be equipped in known fashion with an electro-hydraulic control system which operates, for example, steering and motor controls. FIG. 11 shows a block diagram of a portion of a control system 62 utilizing the present invention for a path transition planner 64. The control system 62 includes a work planner 66 for generating paths, a path planner 68 including the present invention for planning transitions between the paths, and a path follower 70 for determining which way to steer the machine to keep it on the path.

The work planner 66 uses information stored in database 72 regarding the perimeter 30 and boundary cushion 32 of work area 20 to determine a series of paths. The path follower 70 determines error signals based on the difference between the machine's current position as provided by a position sensing system such as a global positioning system (GPS) sensor 74, and the desired position of the mobile machine. A navigator 76 uses the error signals to generate velocity and steering commands for actuators 78 connected to the machine's steering and speed controls (not shown). Sensors 80 provide information regarding the actuator positions, and the position, heading, and speed of the mobile machine to the control system 62. Preferably, the work planner 66, path planner 68, path follower 70, and navigator 76 are implemented in software and executed on a digital computer. The database 72 is preferably stored in a memory device, such as a hard drive connected to the digital computer.

To traverse the entire work area 20, the path planner 68 determines the transition from the current or first path 34 to the next or second path 36. A finite number of transition schemes, such as those shown in FIGS. 3 through 10, are stored in the path planner 68 and/or database 72. Each transition scheme is evaluated to determine whether it meets predetermined constraints, such as staying within the perimeter 30 and transitioning to the second path 36 within an allowable amount of overshoot. A validity number is then determined for the transition schemes that meet the predetermined constraints, and the transition scheme having the most desired validity number is selected. In the preferred embodiment, the validity number is a weighted function of path loss, number of interim paths, and the number of direction changes, as discussed hereinabove.

Preferably, the validity value includes weighting factors on the performance criteria. The weighting factors may be constant or variable according to a gain schedule or as functions of other variables. In the preferred embodiment, the performance criteria are selected so that increasing validity values indicate less efficient transition schemes. The function for determining the validity value may alternatively be implemented so that higher numbers indicate more desirable values. In the event that two or more transition schemes have the same validity number, the transition scheme that meets some preselected criteria may be selected. For example, the transition schemes may be stored in memory from most desirable to least desirable, and if a tie occurs, the transition scheme having the lowest index may be selected. Further, in order to limit the number of candidate transition schemes to evaluate for a given machine, only certain transition schemes may be included in a particular embodiment. Alternatively, an extensive database may be included, and information as to which types of machines a particular transition scheme is applicable to may be included. For example, a logical or integer variable may be stored with each transition scheme with a value to indicate that the transition scheme may be used with mobile machines capable of performing a work function while traveling in one direction, such as shown in FIGS. 3 and 8 or bi-directionally, such as the transition schemes shown in FIGS. 3 through 10.

Other aspects, objects and advantages of the present invention can be obtained from a study of the drawings, the disclosure and the appended claims.

What is claimed is:

1. A method for selecting a transition scheme for use in transitioning a mobile machine from a first path having a destination endpoint to a second path within a work area, the method comprising the steps of:
    (a) determining at least two candidate transition schemes having at least one interim path;
    (b) determining a validity grade of the results to be achieved with the at least two candidate transition schemes by evaluating performance criteria involved in transitioning from the first path to the second path; and
    (c) selecting a transition scheme as a function of the validity grade of the results to be achieved using the at least two candidate transition schemes.

2. The method, as set forth in claim 1, wherein the work area includes a boundary cushion area around the first and second paths and a perimeter around the boundary cushion, and step (a) further comprises determining whether the at least one interim path is within the perimeter.

3. The method, as set forth in claim 1, wherein step (a) further comprises determining the amount of overshoot associated with transitioning between the first path and the second path based on the at least one candidate transition scheme.

4. The method, as set forth in claim 1, wherein step (b) further comprises determining a validity grade for the at least one candidate transition scheme based on the number of interim paths required.

5. The method, as set forth in claim 1, wherein step (b) further comprises determining a validity grade for the at least one candidate transition scheme based on the distance along the first path and the second path that the mobile machine will not traverse when following the at least one candidate transition scheme.

6. The method, as set forth in claim 1, wherein step (b) further comprises determining a validity grade for the candidate transition scheme based on the number of changes in heading of the mobile machine required to transition between the first path and the second path.

7. The method, as set forth in claim 1, wherein step (b) further comprises determining a validity grade for the candidate transition scheme using at least one weighting factor with the at least one performance criteria.

8. The method, as set forth in claim 1, wherein step (a) further comprises determining the at least one interim path required to transition from the first path to the second path based on the candidate transition scheme, the turning radius of the mobile machine, the heading of the mobile machine along the first path, the heading of the mobile machine along the second path, and the destination endpoint of the first path.

9. An apparatus for selecting a transition scheme for use in transitioning a mobile machine from a first path having a destination endpoint to a second path within a work area, the apparatus comprising:
    at least two candidate transition schemes having at least one interim path;
    means for determining a validity grade of the results to be achieved with the at least two candidate transition schemes by evaluating performance criteria involved in transitioning from the first path to the second path; and
    means for selecting a transition scheme as a function of the validity grade of the results to be achieved using the at least two candidate transition schemes.

10. The apparatus, as set forth in claim 9, wherein the work area includes a boundary cushion area around the first and second paths and a perimeter around the boundary cushion, further comprising means for determining whether the at least one interim path is within the perimeter.

11. The apparatus, as set forth in claim 9, further comprising means for determining the amount of overshoot associated with transitioning between the first path and the second path based on the at least one candidate transition scheme.

12. The apparatus, as set forth in claim 9, further comprising means for determining a validity grade for the at least one candidate transition scheme based on the distance along the first path and the second path that the mobile machine will not traverse when following the at least one candidate transition scheme.

13. The apparatus, as set forth in claim 9, further comprising means for determining a validity grade for the at least one candidate transition scheme based on the number of changes in heading of the mobile machine required to transition between the first path and the second path.

14. The apparatus, as set forth in claim 9, further comprising means for determining a validity grade for the at least one candidate transition scheme based on the number of interim paths required to transition between the first path and the second path.

15. The apparatus, as set forth in claim 9, further comprising means for determining a validity grade for the candidate transition scheme using at least one weighting factor for the at least one performance criteria.

16. The apparatus, as set forth in claim 9, further comprising means for determining the at least one interim path required to transition from the first path to the second path based on the candidate transition scheme, the turning radius of the mobile machine, the heading of the mobile machine along the first path, the heading of the mobile machine along the second path, and the destination endpoint of the first path.

17. An apparatus for selecting a transition scheme for use in transitioning a mobile machine from a first path to a second path within a work area bounded by a perimeter, the apparatus comprising:
- a plurality of candidate transition schemes, the transition schemes including at least one interim path between the first path and the second path; and
- a data processor operable to determine a validity grade for the candidate transition schemes, the validity grade being based on the amount the at least one interim path overshoots the second path.

18. The apparatus, as set forth in claim 17, wherein the data processor is further operable to determine the validity grade based on whether the at least one interim path is within the perimeter.

19. The apparatus, as set forth in claim 18, wherein the data processor is further operable to determine the validity grade based on the amount of the first path and the second path traversed by the mobile machine.

20. The apparatus, as set forth in claim 19, wherein the data processor is further operable to determine the validity grade based on the number of interim paths required by the transition scheme.

21. The apparatus, as set forth in claim 20, wherein the data processor is further operable to determine the validity grade based the number of heading changes required by the transition scheme.

22. The apparatus, as set forth in claim 21, wherein the data processor is further operable to select the transition scheme with the optimum validity grade.

* * * * *